(12) United States Patent
Gorlier et al.

(10) Patent No.: US 7,369,732 B2
(45) Date of Patent: May 6, 2008

(54) CHROMATIC DISPERSION-COMPENSATING OPTICAL FIBRE IN THE S-BAND USING A HIGHER ORDER MODE

(75) Inventors: Maxime Gorlier, Paris (FR); Denis Molin, Le Chesnay (FR); Louis-Anne De Montmorillon, Paris (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 77 days.

(21) Appl. No.: 11/077,116

(22) Filed: Mar. 11, 2005

(65) Prior Publication Data
US 2005/0213909 A1 Sep. 29, 2005

(30) Foreign Application Priority Data
Mar. 16, 2004 (FR) .................................. 04 50525

(51) Int. Cl.
*G02B 6/02* (2006.01)
(52) U.S. Cl. .......................................... 385/124; 385/28
(58) Field of Classification Search ................ 385/124, 385/28
See application file for complete search history.

(56) References Cited

U.S. PATENT DOCUMENTS

| 6,856,743 | B2 * | 2/2005 | Bickham | 385/127 |
| 6,912,348 | B2 * | 6/2005 | Sillard et al. | 385/123 |
| 6,931,186 | B2 * | 8/2005 | Sillard et al. | 385/123 |
| 6,952,519 | B2 * | 10/2005 | Bickham et al. | 385/127 |
| 7,082,243 | B2 * | 7/2006 | Bickham et al. | 385/127 |
| 2003/0185531 | A1 | 10/2003 | Lysiansky et al | |
| 2004/0105638 | A1 * | 6/2004 | Sillard et al. | 385/123 |
| 2004/0105642 | A1 * | 6/2004 | Bickham | 385/127 |
| 2004/0218882 | A1 * | 11/2004 | Bickham et al. | 385/127 |

FOREIGN PATENT DOCUMENTS

| EP | 1351417 A1 | 10/2003 |
| FR | 0204271 A1 | 4/2002 |
| FR | 1351417 | * 10/2006 |

* cited by examiner

*Primary Examiner*—K. Cyrus Kianni
(74) *Attorney, Agent, or Firm*—Sughrue Mion, PLLC

(57) ABSTRACT

The invention relates to an chromatic dispersion-compensating optical fibre in the S-band, for use in compensating for the chromatic dispersion of either a standard SMF optical fibre or of an NZ-DSF optical fibre, carrying an optical signal in the spectral band in use, which is the S-band extending from 1460 nm to 1530 nm. The chromatic dispersion-compensating optical fibre in the S-band has a wavelength corresponding to the global chromatic dispersion minimum, which is situated outside the spectral band in use, that is to say outside the S-band.

3 Claims, 3 Drawing Sheets

| | Type | r1 μm | r2 μm | r3 μm | r4 μm | r5 μm | $10^3$ Δn1 | $10^3$ Δn2 | $10^3$ Δn3 | $10^3$ Δn4 | $10^3$ Δn5 |
|---|---|---|---|---|---|---|---|---|---|---|---|
| HOM7 | 3 S | 3,75 | 9,62 | 13,75 | | | 27,7 | 1 | 2,14 | | |
| HOM8 | 4 S | 4,22 | 7 | 14,28 | 15,7 | | 23,1 | -0,1 | 2,1 | 0,5 | |
| HOM9 | 5 S | 4,1 | 6,24 | 8,27 | 11,04 | 15,48 | 24,4 | -0,4 | 1,4 | 2,5 | 1,5 |
| HOM10 | 5 S | 3,66 | 5,46 | 11 | 12,48 | 15,6 | 30 | -1,1 | 1,6 | -2,2 | 2,6 |
| HOM11 | 4 S | 4,74 | 7,93 | 13,98 | 15,37 | | 19,1 | -4,3 | 2,4 | 1,5 | |
| HOM12 | 5 S | 4,56 | 5,6 | 7,61 | 10,66 | 15,22 | 21,6 | -3,8 | -2,7 | 2,5 | 1,9 |

Figure 1

|  | Type | r1 µm | r2 µm | r3 µm | r4 µm | r5 µm | 10³ Δn1 | 10³ Δn2 | 10³ Δn3 | 10³ Δn4 | 10³ Δn5 |
|---|---|---|---|---|---|---|---|---|---|---|---|
| HOM1 | 3 S | 3,5 | 6,74 | 14,96 |  |  | 30 | 2,1 | 0,6 |  |  |
| HOM2 | 4 S | 3,62 | 10,67 | 13,53 | 16,5 |  | 28,4 | 1,6 | -2,8 | 3,3 |  |
| HOM3 | 5 S | 3,53 | 5,18 | 8,82 | 11,68 | 15,3 | 29,2 | 1,6 | 2,5 | -2,1 | 2,9 |
| HOM4 | 4 S | 3,48 | 9,54 | 14,46 | 16,21 |  | 30 | 1,7 | 0,8 | 4,7 |  |
| HOM5 | 5 S | 3,52 | 6,02 | 9,22 | 12,88 | 16 | 30 | 0,7 | 2,7 | -2,3 | 3,5 |

Figure 2

|  | Type | Dispersion Ps/nm-km | Dispersion/slope nm | $S_{eff}$ µm² | $\lambda_{min}$ nm | Max variation of the slope | |
|---|---|---|---|---|---|---|---|
|  |  |  |  |  |  | [1475-1515nm] | [1465-1525nm] |
| HOM1 | 3 S | -280 | 230 | 68 | 1575 | 8% | 14% |
| HOM2 | 4 S | -280 | 230 | 72 | 1595 | 8% | 11% |
| HOM3 | 5 S | -300 | 280 | 81 | 1575 | 0% | 2% |
| HOM4 | 4 S | -320 | 250 | 75 | 1580 | 11% | 16% |
| HOM5 | 5 S | -350 | 230 | 73 | 1575 | 9% | 12% |

Figure 3

|  | Type | r1 µm | r2 µm | r3 µm | r4 µm | r5 µm | 10³ Δn1 | 10³ Δn2 | 10³ Δn3 | 10³ Δn4 | 10³ Δn5 |
|---|---|---|---|---|---|---|---|---|---|---|---|
| HOM7 | 3 S | 3,75 | 9,62 | 13,75 |  |  | 27,7 | 1 | 2,14 |  |  |
| HOM8 | 4 S | 4,22 | 7 | 14,28 | 15,7 |  | 23,1 | -0,1 | 2,1 | 0,5 |  |
| HOM9 | 5 S | 4,1 | 6,24 | 8,27 | 11,04 | 15,48 | 24,4 | -0,4 | 1,4 | 2,5 | 1,5 |
| HOM10 | 5 S | 3,66 | 5,46 | 11 | 12,48 | 15,6 | 30 | -1,1 | 1,6 | -2,2 | 2,6 |
| HOM11 | 4 S | 4,74 | 7,93 | 13,98 | 15,37 |  | 19,1 | -4,3 | 2,4 | 1,5 |  |
| HOM12 | 5 S | 4,56 | 5,6 | 7,61 | 10,66 | 15,22 | 21,6 | -3,8 | -2,7 | 2,5 | 1,9 |

Figure 4

|  | Type | Dispersion Ps/nm-km | Dispersion/slope nm | $S_{eff}$ µm² | $\lambda_{min}$ nm | Max variation of the slope | |
|---|---|---|---|---|---|---|---|
|  |  |  |  |  |  | [1475-1515nm] | [1465-1525nm] |
| HOM7 | 3 S | -300 | 101 | 64 | 1565 | 30% | 39% |
| HOM8 | 4 S | -300 | 93 | 77 | 1550 | 12% | 24% |
| HOM9 | 5 S | -320 | 94 | 72 | 1550 | 13% | 20% |
| HOM10 | 5 S | -320 | 100 | 54 | 1580 | 38% | 54% |
| HOM11 | 4 S | -220 | 94 | 89 | 1555 | 11% | 20% |
| HOM12 | 5 S | -200 | 50 | 58 | 1570 | 88% | 126% |

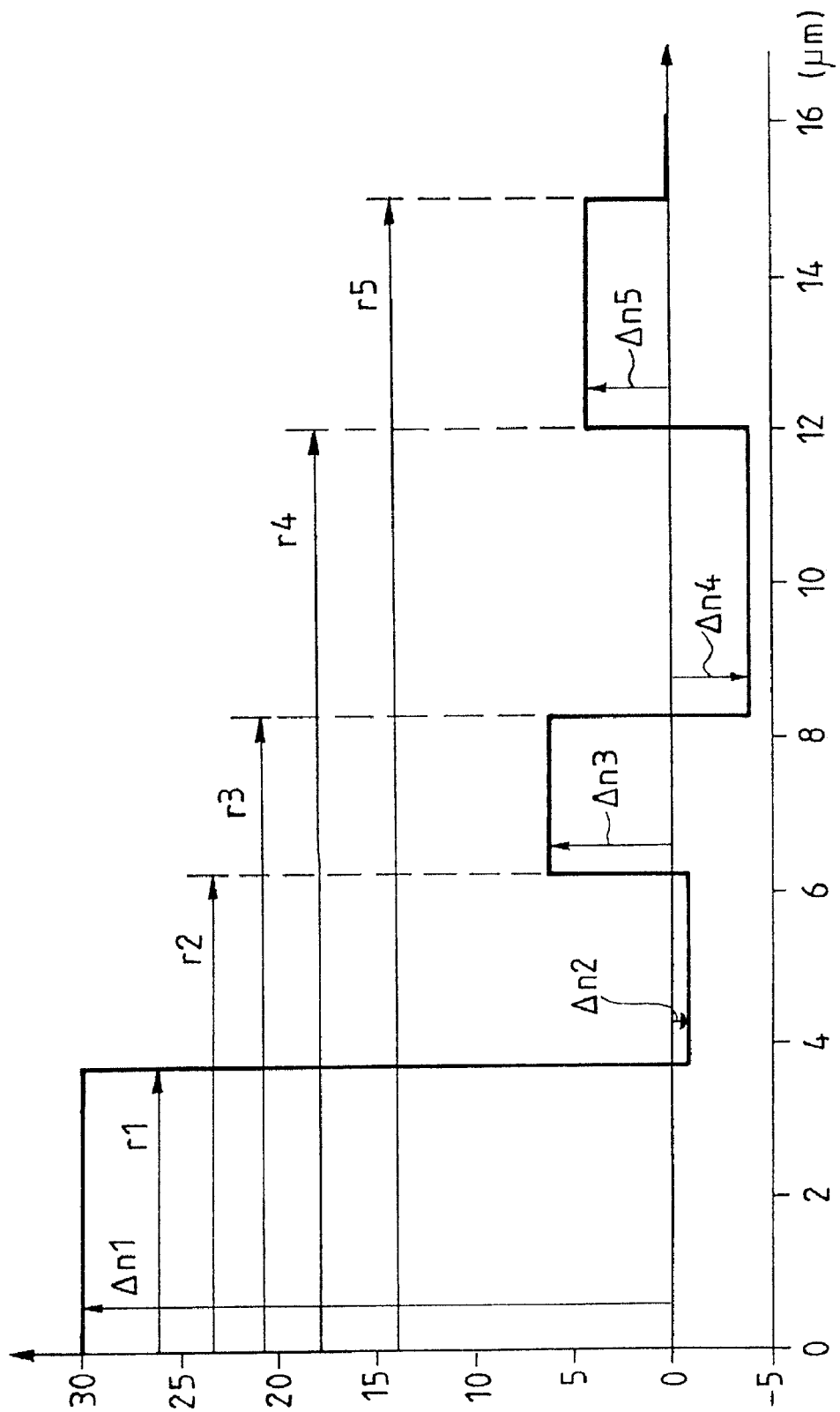
FIG_5 PRIOR ART

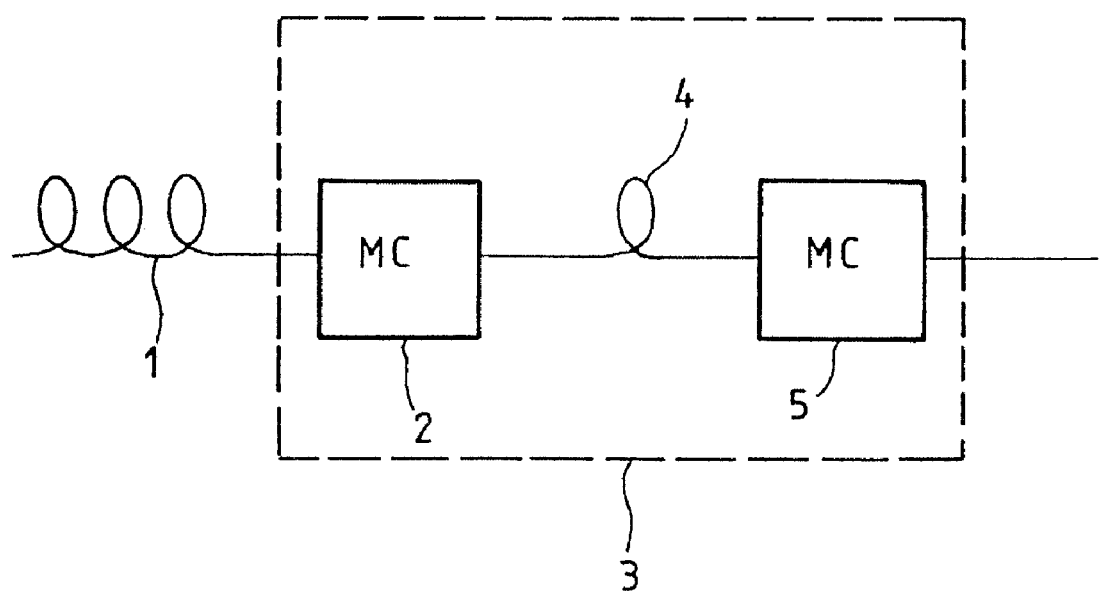
FIG_6
PRIOR ART

CHROMATIC DISPERSION-COMPENSATING OPTICAL FIBRE IN THE S-BAND USING A HIGHER ORDER MODE

The invention relates to the field of chromatic dispersion-compensating optical fibres for a wavelength multiplexing transmission system. The function of the dispersion-compensating optical fibre is to compensate for the chromatic dispersion of a so-called line fibre. The invention relates more precisely to an chromatic dispersion-compensating optical fibre in the S-band for use in compensating for the chromatic dispersion of either a standard SMF optical fibre or of an NZ-DSF optical fibre, where the line optical fibre carries an optical signal in the spectral band in use, which is the S-band extending from 1460 nm to 1530 nm.

According to a first item of prior art, described in Patent Application FR 0204271, which is hereby incorporated by reference, there is known an example of an HOM chromatic dispersion-compensating optical fibre (or higher order mode optical fibre) in the C-band and/or L-band, which exhibits slight variations in the chromatic dispersion slope in the C- and/or L-band, thus enabling good compensation for chromatic dispersion and for the chromatic dispersion slope of the line optical fibre. That compensating optical fibre is not, however, suitable for use in the S-band. Its minimum chromatic dispersion wavelength is too high and too far removed from the S-band. The minimum chromatic dispersion wavelength is the wavelength corresponding to a global chromatic dispersion minimum.

According to a second item of prior art, described in European Patent EP 1 351 417 of the present Applicant, there is known a dispersion-compensating optical fibre for a wavelength multiplexing transmission system, comprising, from the centre towards the periphery, a core having a variable index profile then a cladding of constant index, wherein, the chromatic dispersion is less than −150 ps/nm.km, the chromatic dispersion slope is strictly negative, and the effective area is greater than 40 µm². Furthermore, the difference between the wavelength corresponding to the overall minimum chromatic dispersion and the wavelength corresponding to an upper limit of an operating spectral range greater than 30 nm is greater than 35 nm, and the relative variation of the dispersion slope over said operating spectral range has an absolute value less than 30%.

According to a third item of prior art, described in US Patent Application US2003/0185531, there is known a limited mode dispersion compensating optical fiber supporting at least one high order spatial mode comprising: a plurality of core areas, the refractive index profile of which are selected to result in an optical waveguide providing in the $LP_{02}$ mode: dispersion more negative than −300 ps/nm/km at a representative wavelength, designated $\lambda_0$, within an operative waveband; projected zero dispersion less than ($\lambda_0$−75 nm), where projected zero dispersion is defined as $\lambda_0$-Dispersion $(_{\lambda 0})$/Slope $(_{\lambda 0})$; and third order dispersion less than 2% over the operative waveband, where third order dispersion is defined as the maximum deviation from a best line fit for dispersion divided the best fit dispersion at $\lambda_0$, said best fit line chosen to minimize said maximum deviation.

The solution proposed by the invention accordingly relates to an HOM dispersion-compensating optical fibre in the S-band exhibiting as small variations as possible in the chromatic dispersion slope in order to enable effective compensation for chromatic dispersion and for the chromatic dispersion slope across the entire S-band. In order to do so, the minimum chromatic dispersion wavelength is selected from a narrow and optimum spectral range in order to ensure a good compromise between the low level of variation in the chromatic dispersion slope in the S-band, the high value for effective area, the very negative chromatic dispersion value, and a chromatic dispersion to chromatic dispersion slope ratio that is as close as possible to that of the line optical fibre to be compensated. Depending on whether the compensation is for a standard SMF (single mode fibre) optical fibre or for an NZ-DSF (non-zero dispersion shifted fibre) optical fibre, the optimum range for the minimum chromatic dispersion wavelength and the compromise between the parameters and optical properties being sought are slightly different.

In order to compensate a standard SMF optical fibre carrying an optical signal in the S-band, according to the invention there is provided an chromatic dispersion-compensating optical fibre in the spectral band S extending from 1460 nm to 1530 nm for a wavelength multiplexing transmission system, comprising successively, from the centre to the periphery, a core having a variable index profile and then a cladding of constant index, enabling the propagation, at a wavelength of 1495 nm, in addition to the fundamental mode $LP_{01}$, of at least one higher order mode, the index profile of the core being determined in such a manner that, for said higher mode, on the one hand at a wavelength of 1495 nm, firstly the chromatic dispersion is less than −150 ps/nm-km, secondly the chromatic dispersion to chromatic dispersion slope ratio is between 200 nm and 300 nm, and thirdly the effective area is greater than 60 µm² and, on the other hand, the wavelength corresponding to the global chromatic dispersion minimum is between 1550 nm and 1600 nm.

In order to enable more precise compensation for the chromatic dispersion of a standard SMF optical fibre across the entire S-band, preferably the index profile of the core is determined in such a manner that, for said higher mode, at a wavelength of 1495 nm, the chromatic dispersion to chromatic dispersion slope ratio is between 200 nm and 250 nm.

In order to improve the compromise achieved between the optical properties of the dispersion-compensating optical fibre according to the invention whilst preserving a low variation in the chromatic dispersion slope across the entire S-band, preferably the index profile of the core is determined in such a manner that, for said higher mode, at a wavelength of 1495 nm, the wavelength corresponding to the global chromatic dispersion minimum is between 1570 nm and 1590 nm.

In order to improve the quality of the compensation of the HOM type chromatic dispersion-compensating optical fibre according to the invention and its other properties, a number of preferred ranges for the indices and the radii of the index profile of the core will now be given. The expression "remains less than" means "is less than" if the parameter is constant and means "remains less than" over the slice under consideration if the parameter is variable over the slice under consideration.

Preferably the index profile of the core is determined in such a manner that, for said higher mode, at a wavelength of 1495 nm, the effective area is greater than 70 µm², and preferably greater than 80 µm².

Preferably the maximum index difference $\Delta n_1$ between the index of the central slice and the index of the cladding is between $20.10^{-3}$ and $32.10^{-3}$ and the outer radius $r_1$ of the central slice is between 3 µm and 4.5 µm.

Preferably the value of the integral $$S_{01} = \int_0^{r1} \Delta n(r).dr$$

of the index difference relative to the cladding, between a zero radius and the radius $r_1$ of the portion of the central slice having an index higher than the index of the cladding, is between $100.10^{-3}$ and $115.10^{-3}$ μm.

Preferably the value of twice the integral $$T_{01} = 2.\int_0^{r1} \Delta n(r).r.dr$$

of the product of the index difference relative to the cladding times the radius, between a zero radius and the radius $r_1$ of the portion of the central slice having an index higher than the index of the cladding, is between $325.10^{-3}$ μm$^2$ and $475.10^{-3}$ μm$^2$.

Preferably the value of twice the integral $$T_{03} = 2.\int_0^{r3} \Delta n(r).r.dr$$

of the product of the index difference relative to the cladding times the radius, between a zero radius and the radius $r_3$ of the second peripheral slice, is between $400.10^{-3}$ μm$^2$ and $800.10^{-3}$ μm$^2$.

Preferably the index difference $\Delta n_2$ between the index of the first peripheral slice and the index of the cladding is between $-4.10^{-3}$ and $5.10^{-3}$ and the outer radius $r_2$ of the first peripheral slice is between 5 μm and 11 μm.

Preferably the index difference $\Delta n_3$ between the index of the second peripheral slice and the index of the cladding is between $-5.10^{-3}$ and $5.10^{-3}$ and the outer radius $r_3$ of the second peripheral slice is between 8 μm and 15 μm.

Preferably the index difference $\Delta n_4$ between the index of the third peripheral slice and the index of the cladding is between $-5.10^{-3}$ and $5.10^{-3}$ and the outer radius $r_4$ of the third peripheral slice is between 11 μm and 17 μm.

Preferably the index difference $\Delta n_5$ between the index of the fourth peripheral slice and the index of the cladding is between $0$ and $10.10^{-3}$ and the outer radius $r_5$ of the fourth peripheral slice is between 14 μm and 17 μm.

To compensate an NZ-DSF optical fibre carrying an optical signal in the S-band, according to the invention there is provided an chromatic dispersion-compensating optical fibre in the spectral band S extending from 1460 nm to 1530 nm, for a wavelength multiplexing transmission system, comprising successively, from the centre to the periphery, a core having a variable index profile and then a cladding of constant index, enabling the propagation, at a wavelength of 1495 nm, in addition to the fundamental mode $LP_{01}$, of at least one higher order mode, the index profile of the core being determined in such a manner that, for said higher mode, on the one hand at a wavelength of 1495 nm, firstly the chromatic dispersion is lower than $-150$ ps/nm-km, secondly the chromatic dispersion to chromatic dispersion slope ratio is less than 130 nm and thirdly the effective area is greater than 50 μm$^2$ and, on the other hand, the wavelength corresponding to the global chromatic dispersion minimum is between 1530 nm and 1580 nm.

In order to enable more precise compensation for the chromatic dispersion of a standard SMF optical fibre across the entire S-band, preferably the index profile of the core is determined in such a manner that, for said higher mode, at a wavelength of 1495 nm, the chromatic dispersion to chromatic dispersion slope ratio is between 90 nm and 110 nm.

In order to improve the compromise achieved between the optical properties of the dispersion-compensating optical fibre according to the invention whilst preserving a low variation in the chromatic dispersion slope across the entire S-band, preferably the index profile of the core is determined in such a manner that, for said higher mode, at a wavelength of 1495 nm, the wavelength corresponding to the global chromatic dispersion minimum is between 1540 nm and 1560 nm.

In order to improve the quality of the compensation of the HOM type chromatic dispersion-compensating optical fibre according to the invention and its other properties, a number of preferred ranges for the indices and radii of the index profile of the core will be given. The expression "remains less than" means "is less than" if the parameter is constant and means "remains less than" over the slice under consideration if the parameter is variable over the slice under consideration.

Preferably the index profile of the core is determined in such a manner that, for said higher mode, at a wavelength of 1495 nm, the effective area is greater than 65 μm$^2$, preferably greater than 80 μm$^2$.

Preferably the maximum index difference $\Delta n_1$ between the index of the central slice and the index of the cladding is between $15.10^{-3}$ and $30.10^{-3}$ and the outer radius $r_1$ of the central slice is between 3.5 μm and 5 μm.

Preferably the value of twice the integral $$T_{01} = 2.\int_0^{r1} \Delta n(r).r.dr$$

of the product of the index difference relative to the cladding times the radius, between a zero radius and the radius $r_1$ of the portion of the central slice having an index higher than the index of the cladding, is between $375.10^{-3}$ μm$^2$ and $525.10^{-3}$ μm$^2$.

Preferably the value of twice the integral $$T_{03} = 2.\int_0^{r3} \Delta n(r).r.dr$$

of the product of the index difference relative to the cladding times the radius, between a zero radius and the radius $r_3$ of the second peripheral slice, is between $400.10^{-3}$ μm$^2$ and $700.10^{-3}$ μm$^2$.

Preferably the index difference $\Delta n_2$ between the index of the first peripheral slice and the index of the cladding is between $-7.10^{-3}$ and $5.10^{-3}$ and the outer radius $r_2$ of the first peripheral slice is between 5 μm and 10 μm.

Preferably the index difference $\Delta n_3$ between the index of the second peripheral slice and the index of the cladding is between $-5.10^{-3}$ and $5.10^{-3}$ and the outer radius $r_3$ of the second peripheral slice is between 7 μm and 15 μm.

Preferably the index difference $\Delta n_4$ between the index of the third peripheral slice and the index of the cladding is between $-5.10^{-3}$ and $5.10^{-3}$ and the outer radius $r_4$ of the third peripheral slice is between 10 µm and 16 µm.

Preferably the index difference $\Delta n_5$ between the index of the fourth peripheral slice and the index of the cladding is between 0 and $10.10^{-3}$ and the outer radius $r_5$ of the fourth peripheral slice is between 14 µm and 17 µm.

Whether the compensation is for a standard SMF optical fibre or an NZ-DSF optical fibre, the optical fibre preferably has the following advantageous characteristics.

Preferably the higher order mode is the mode $LP_{02}$, for which mode chromatic dispersion-compensating optical fibres exhibiting very negative chromatic dispersions can readily be obtained, and which mode is not very sensitive to defects in the circular geometry of the fibre, which defects are responsible for the polarisation problems. Other higher order modes are, however, possible, such as for example the mode $LP_{11}$ or the mode $LP_{03}$.

Preferably the index profile of the core is determined in such a manner that, for said higher mode, at a wavelength of 1495 nm, the chromatic dispersion is less than -200 ps/nm-km, preferably less than -250 ps/nm-km, advantageously less than -300 ps/nm-km, which makes it possible, for a given line optical fibre, to reduce the length of the compensation optical fibre to be used.

The operational spectral band used is the S-band from 1460 nm to 1530 nm. An optical fibre wavelength multiplexing transmission system, described in greater detail hereinafter, integrating an HOM type dispersion-compensating optical fibre according to the invention will preferably have an absolute value for cumulative chromatic dispersion for each wavelength between 1460 nm and 1530 nm of less than 30 ps/nm on average over 100 km of transmission.

Preferably the index profile of the core comprises at least four slices. The index profile of the core advantageously comprises at least five slices. The more negative the chromatic dispersion, the higher the number of slices in the index profile of the core required to obtain good linearity of the curve for the chromatic dispersion as a function of the wavelength for the HOM type dispersion-compensating optical fibre according to the invention. That high number of slices makes it possible to obtain an HOM type chromatic dispersion-compensating optical fibre that, whilst enabling very good compensation for chromatic dispersion, does not have too serious an effect on the other properties of said HOM type chromatic dispersion-compensating optical fibre. Five slices constitutes a good compromise between the properties of the HOM type dispersion-compensating optical fibre and the complexity of its manufacture, for compensation in the spectral band S. The shape of the slices is, for example, rectangular, but it may also be triangular, trapezoidal or alpha-shaped.

In a first preferred embodiment of the invention, the HOM type chromatic dispersion-compensating optical fibre according to the invention comprises a variable index profile of a core having four slices. The variable index profile of the core thus comprises successively, from the centre to the periphery, a central slice having a maximum index higher than the index of the cladding, a first peripheral slice having a maximum index less than the maximum index of the central slice, a second peripheral slice having a maximum index less than the maximum index of the central slice, and a third peripheral slice having a maximum index less than the maximum index of the central slice.

In a second preferred embodiment of the invention, the HOM type optical fibre providing dispersion compensation according to the invention comprises a variable index profile of a core having five slices. The variable index profile of the core accordingly comprises successively, from the centre to the periphery, a central slice having a maximum index higher than the index of the cladding, a first peripheral slice having a maximum index less than the maximum index of the central slice, a second peripheral slice having a maximum index less than the maximum index of the central slice, a third peripheral slice having a maximum index less than the maximum index of the central slice, and a fourth peripheral slice having a maximum index less than the maximum index of the central slice.

The invention relates also to a chromatic dispersion compensation module integrating an HOM type chromatic dispersion-compensating optical fibre according to the invention. Preferably that module comprises successively in series a first mode converter capable of converting the fundamental mode to the higher order mode, an dispersion-compensating optical fibre according to the invention and a second mode converter capable of converting the higher order mode back to the fundamental mode. That module may be integrated in an optical fibre wavelength multiplexing transmission system, which system accordingly comprises successively in series a line optical fibre and a compensation module according to the invention. In that optical fibre wavelength multiplexing transmission system according to the invention, the ratio between the length of the line optical fibre and the length of the dispersion compensation optical fibre is preferably more or less the inverse of the absolute value of the ratio between the chromatic dispersion of the line optical fibre at a wavelength of 1495 nm and the chromatic dispersion of the chromatic dispersion compensation optical fibre at a wavelength of 1495 nm, in order to enable optimised compensation.

The invention will be better understood and other particularities and advantages will become apparent from the description given hereinbelow and the attached drawings, given by way of example, wherein:

FIG. 1 is a table giving the values of radii and index differences for some examples of profiles of HOM type chromatic dispersion-compensating optical fibres according to the invention for use in compensating a standard SMF optical fibre;

FIG. 2 is a table giving other properties of the profiles of HOM type chromatic dispersion-compensating optical fibres according to the invention shown in FIG. 1 for the mode $LP_{02}$;

FIG. 3 is a table giving the values of radii and index differences for some examples of profiles of HOM type chromatic dispersion-compensating optical fibres according to the invention for use in compensating an NZ-DSF optical fibre;

FIG. 4 is a table giving other properties of the profiles of HOM type chromatic dispersion-compensating optical fibres according to the invention shown in FIG. 1 for the mode $LP_{02}$;

FIG. 5 (prior art) shows diagrammatically a type of index profile comprising five slices of an HOM type chromatic dispersion-compensating optical fibre according to the invention; and FIG. 6 (prior art) shows diagrammatically an optical fibre wavelength multiplexing transmission system according to the invention.

FIG. 1 is a table giving the values of radii and index differences for some examples of profiles of HOM type dispersion-compensating optical fibres according to the invention for use in compensating a standard SMF optical fibre. The left-hand column shows the denomination of the profiles from HOM1 to HOM5. The second column indicates the number of slices that the core index profile of the example under consideration comprises. The next five columns give radii of the core variable index profile in µm. The last five columns give the index differences relative to the cladding of constant index multiplied by a thousand (no units). Not all the boxes in the Table have been completed, since the profiles do not all have the same number of slices.

FIG. 2 is a table giving other properties of the profiles of HOM type chromatic dispersion-compensating optical fibres according to the invention shown in FIG. 1 for the mode $LP_{02}$. The left-hand column gives the denomination of the profiles already explained above. The next column indicates the number of slices that each profile under consideration comprises. For each profile under consideration, the other columns give properties of the slice of optical fibre corresponding to the profile under consideration. The next column gives the chromatic dispersion in ps/nm-km at a wavelength of 1495 nm. The next column gives the chromatic dispersion to chromatic dispersion slope ratio in nm at a wavelength of 1495 nm. The next column gives the effective area $A_{eff}$ in µm² at a wavelength of 1495 nm. The next column gives the minimum chromatic dispersion wavelength $\lambda_{min}$ in nm. The last two columns give the maximum relative variations in chromatic dispersion slope as a %, respectively, for operational spectral ranges from 1475 nm to 1515 nm and from 1465 nm to 1525 nm. The relative variation in the dispersion slope over an operational spectral range corresponds to the quotient between, on the one hand, the difference between the maximum chromatic dispersion slope over said operational spectral range and the minimum chromatic dispersion slope over said operational spectral range and, on the other hand, the mean chromatic dispersion slope for said operational spectral range. Optical fibres having four slices and preferably five slices make it possible to achieve better compromises between the most negative chromatic dispersion possible, the greatest effective area possible and the most linear chromatic dispersion slope possible over the operational spectral range under consideration. A minimum dispersion wavelength in the preferred narrow range of from 1570 nm to 1590 nm also makes it possible to improve the compromise.

FIG. 3 is a table giving the values of radii and index differences for some examples of profiles of HOM type chromatic dispersion-compensating optical fibres according to the invention for use in compensating an NZ-DSF optical fibre. FIG. 3 is similar to FIG. 1, but the left-hand column gives the denomination of the profiles from HOM7 to HOM12.

FIG. 4 is a table giving other properties of the profiles of HOM type chromatic dispersion-compensating optical fibres according to the invention shown in FIG. 3 for the mode $LP_{02}$. Optical fibres having four slices and preferably five slices make it possible to achieve better compromises between the most negative chromatic dispersion possible, the greatest effective area possible and the most linear chromatic dispersion slope possible over the operational spectral range under consideration. A minimum dispersion wavelength within the preferred narrow range of from 1540 nm to 1560 nm also makes it possible to improve the compromise. The linearity of the chromatic dispersion slope of Examples HOM7, HOM10 and HOM12, the minimum dispersion wavelengths of which are outside said minimum chromatic dispersion wavelength range is appreciably worse than that of the other Examples, their effective areas also being smaller. The attempt to find a low chromatic dispersion to chromatic dispersion slope ratio seems to have a deleterious effect on the compromise obtained, as shown by the poor linearity of the chromatic dispersion slope of Example HOM12. The most interesting Examples correspond to a threshold of 30% for the column on the far right of the table. That threshold of 30% also applies for chromatic dispersion-compensating optical fibres for use in compensating a standard SMF line optical fibre.

FIG. 5 shows diagrammatically a five-slice profile type of an HOM type chromatic dispersion-compensating optical fibre according to the invention. Plotted along the abscissa are the radii in µm. Plotted along the ordinate are the index differences multiplied by a thousand without units. The first slice, called the central slice, has a maximum index difference $\Delta n_1$ with the constant index of the cladding and an outer radius $r_1$. The maximum index difference $\Delta n_1$ is positive. Between a zero radius and the radius $r_1$, the index is preferably constant. The second slice, called the first peripheral slice, has an index difference $\Delta n_2$ with the constant index of the cladding and an outer radius $r_2$. The index difference $\Delta n_2$ can be positive or negative. A negative index difference corresponds to a buried slice. The index is preferably constant between radius $r_1$ and radius $r_2$. The third slice, called the second peripheral slice, has an index difference $\Delta n_3$ with the constant index of the cladding and an outer radius $r_3$. The index difference $\Delta n_3$ can be positive or negative. The index is preferably constant between radius $r_2$ and radius $r_3$. The fourth slice, called the third peripheral slice, has an index difference $\Delta n_4$ with the constant index of the cladding and an outer radius $r_4$. The index difference $\Delta n_4$ can be positive or negative. The index is preferably constant between radius $r_3$ and radius $r_4$. The fifth slice, called the fourth peripheral slice, has an index difference $\Delta n_5$ with the constant index of the cladding and an outer radius $r_5$. The index difference $\Delta n_5$ can be positive or negative. The index is preferably constant between radius $r_4$ and radius $r_5$. Beyond the radius $r_5$ is the cladding of constant index. For optical fibres having only four slices, the cladding of constant index starts from the radius $r_4$. For optical fibres having only three slices, the cladding of constant index starts from the radius $r_3$.

FIG. 6 shows diagrammatically an optical fibre wavelength multiplexing transmission system according to the invention. The transmission system comprises successively in series the following elements, viewed from upstream to downstream from the point of view of the propagation of the light signal: a line optical fibre 1 followed by a compensation module 3 which comprises first of all a mode converter 2 that converts most of the light energy being propagated according to the fundamental mode $LP_{01}$ to a higher order mode, for example $LP_{02}$, and then an HOM type chromatic dispersion-compensating optical fibre 4 according to the invention, compensating for the chromatic dispersion of the line optical fibre 1 but in the higher order mode $LP_{02}$, and then a mode converter 5 that converts most of the light energy being propagated according to the higher order mode $LP_{02}$ back to the fundamental mode $LP_{01}$. The transmission system according to the invention may also comprise other elements not shown in FIG. 6 for reasons of clarity, such as transmitters, receivers, amplifiers, and/or may contain the sequence of elements shown in FIG. 6 several times.

Preferably the losses caused by bending for a radius of 10 mm, at a wavelength of 1495 nm, are less than 100 dB/m, advantageously less than 50 dB/m.

Preferably the attenuation, at a wavelength of 1495 nm, is less than 1.5 dB/km, advantageously less than 1 dB/km.

Preferably the polarisation mode dispersion, at a wavelength of 1495 nm, is less than 0.5 ps/km$^{1/2}$, advantageously less than 0.2 ps/km$^{1/2}$.

The invention claimed is:

1. Chromatic dispersion-compensating optical fibre in an S-band extending from 1460 nm to 1530 nm, for a wavelength multiplexing transmission system, comprising successively, from a centre to a periphery, a core having a variable index profile and then a cladding of constant index, enabling a propagation, at a wavelength of 1495 nm, in addition to a fundamental mode $LP_{01}$, of at least one higher order mode, the index profile of the core being determined in such a manner that, for said higher mode, at a wavelength of 1495 nm, firstly a chromatic dispersion is less than -150 ps/nm-km, secondly a chromatic dispersion to chromatic dispersion slope ratio is between 200 nm and 300 nm, and thirdly an effective area is greater than 60 µm$^2$, and, a wavelength corresponding to a global chromatic dispersion minimum is between 1550 nm and 1600 nm;

wherein the variable index profile of the core comprises successively, from the centre to the periphery, a central slice having a maximum index higher than the index of the cladding, a first peripheral slice having a maximum index less than the maximum index of the central slice, a second peripheral slice having a maximum index less than the maximum index of the central slice, a third peripheral slice having a maximum index less than the maximum index of the central slice, and wherein a value of the integral $$\left(S_{01} = \int_0^{r1} \Delta n(r) \, dr\right)$$

of an index difference relative to the cladding, between a zero radius and a radius ($r_1$) of a portion of the central slice having an index higher than the index of the cladding, is between $100 \cdot 10^{-3}$ and $115 \cdot 10^{-3}$ µm.

2. Chromatic dispersion-compensating optical fibre in an S-band extending from 1460 nm to 1530 nm, for a wavelength multiplexing transmission system, comprising successively, from a centre to a periphery, a core having a variable index profile and then a cladding of constant index, enabling a propagation, at a wavelength of 1495 nm, in addition to a fundamental mode $LP_{01}$, of at least one higher order mode, the index profile of the core being determined in such a manner that, for said higher mode, at a wavelength of 1495 nm, firstly a chromatic dispersion is less than -150 ps/nm-km, secondly a chromatic dispersion to chromatic dispersion slope ratio is between 200 nm and 300 nm, and thirdly an effective area is greater than 60 µm$^2$, and, a wavelength corresponding to a global chromatic dispersion minimum is between 1550 nm and 1600 nm:

wherein the variable index profile of the core comprises successively, from the centre to the periphery, a central slice having a maximum index higher than the index of the cladding, a first peripheral slice having a maximum index less than the maximum index of the central slice, a second peripheral slice having a maximum index less than the maximum index of the central slice, a third peripheral slice having a maximum index less than the maximum index of the central slice, and wherein a value of twice the integral $$\left(T_{01} = 2 \cdot \int_0^{r1} \Delta n(r) \, r \, dr\right)$$

of the product of an index difference relative to the cladding times a radius, between a zero radius and a radius ($r_1$) of the portion of the central slice having an index higher than the index of the cladding, is between $325 \cdot 10^{-3}$ µm$^2$ and $475 \cdot 10^{-3}$ µm$^2$.

3. Chromatic dispersion-compensating optical fibre in an S-band extending from 1460 nm to 1530 nm, for a wavelength multiplexing transmission system, comprising successively. from a centre to a periphery, a core having a variable index profile and then a cladding of constant index, enabling a propagation, at a wavelength of 1495 nm, in addition to a fundamental mode $LP_{01}$, of at least one higher order mode, the index profile of the core being determined in such a manner that, for said higher mode, at a wavelength of 1495 nm, firstly a chromatic dispersion is less than -150 ps/nm-km. secondly a chromatic dispersion to chromatic dispersion slope ratio is between 200 nm and 300 nm, and thirdly an effective area is greater than 60 µm$^2$, and, a wavelength corresponding to a global chromatic dispersion minimum is between 1550 nm and 1600 nm;

wherein the variable index profile of the core comprises successively, from the centre to the periphery, a central slice having a maximum index higher than the index of the cladding, a first peripheral slice having a maximum index less than the maximum index of the central slice, a second peripheral slice having a maximum index less than the maximum index of the central slice, a third peripheral slice having a maximum index less than the maximum index of the central slice, and wherein a value of twice the integral $$\left(T_{03} = 2 \int_0^{r3} \Delta n(r) \, r \, dr\right)$$

of the product of an index difference relative to the cladding times a radius, between a zero radius and a radius ($r_3$) of the second peripheral slice, is between $400 \cdot 10^{-3}$ µm$^2$ and $800 \cdot 10^{-3}$ µm$^2$.

* * * * *